(12) United States Patent
Idogawa et al.

(10) Patent No.: US 11,156,174 B2
(45) Date of Patent: Oct. 26, 2021

(54) CONTROLLER FOR VEHICLE AND METHOD FOR CONTROLLING VEHICLE

(71) Applicant: TOYOTA JIDOSHA KABUSHIKI KAISHA, Aichi-ken (JP)

(72) Inventors: Masanao Idogawa, Nagoya (JP); Masahiro Kachi, Nagakute (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/037,711

(22) Filed: Sep. 30, 2020

(65) Prior Publication Data
US 2021/0108581 A1    Apr. 15, 2021

(30) Foreign Application Priority Data

Oct. 9, 2019 (JP) .............................. JP2019-185867

(51) Int. Cl.
*F02N 11/08* (2006.01)
*F02D 41/24* (2006.01)
(Continued)

(52) U.S. Cl.
CPC ..... *F02D 41/0032* (2013.01); *B01D 53/0415* (2013.01); *B01D 53/0454* (2013.01);
(Continued)

(58) Field of Classification Search
CPC ............. F02D 41/0032; F02D 41/2438; B01D 53/0415; B01D 53/0454; F02M 25/0836; F02M 35/10222; F02N 11/0818
(Continued)

(56) References Cited

U.S. PATENT DOCUMENTS 5,720,256 A * 2/1998 Furuya ................ F02D 41/0045
                                                   123/339.12
2012/0020842 A1    1/2012 Hunt et al.
(Continued)

FOREIGN PATENT DOCUMENTS

JP     2002266674 A  *  9/2002  .......... F02N 11/0829
JP      200814193 A      1/2008
(Continued)

OTHER PUBLICATIONS

JP2013209043A (Uehara et al.), Oct. 13, 2013 (machine translation) retrieved from EPO website on Mar. 20, 2021. (Year: 2013).*

*Primary Examiner* — Mahmoud Gimie
(74) *Attorney, Agent, or Firm* — Hauptman Ham, LLP

(57) ABSTRACT

A controller controls a vehicle including an engine with a fuel vapor processing device. The fuel vapor processing device executes purge control that sends fuel vapor of a fuel tank, via a canister, to an intake passage on condition that air-fuel ratio learning is complete. The controller includes processing circuitry. The processing circuitry automatically stops the engine when an automatic stopping condition is satisfied, automatically starts the engine when an automatic starting condition is satisfied, determines that a prohibition condition for prohibiting automatic stopping is satisfied when the air-fuel ratio learning is incomplete, and inhibits automatic stopping of the engine even if the automatic stopping condition is satisfied when determining that the prohibition condition is satisfied.

7 Claims, 5 Drawing Sheets

(51) Int. Cl.
    *F02M 35/10*     (2006.01)
    *F02D 41/00*     (2006.01)
    *B01D 53/04*     (2006.01)
    *F02M 25/08*     (2006.01)

(52) U.S. Cl.
    CPC ..... *F02D 41/2438* (2013.01); *F02M 25/0836* (2013.01); *F02M 35/10222* (2013.01); *F02N 11/0818* (2013.01); *B01D 2259/40086* (2013.01); *B01D 2259/4516* (2013.01)

(58) Field of Classification Search
    USPC ........................................................ 123/519
    See application file for complete search history.

(56) References Cited

U.S. PATENT DOCUMENTS

2012/0204842 A1    8/2012    Kiyomiya
2013/0311061 A1*  11/2013  Ando .................... B60W 10/26
                                                                                  701/102

FOREIGN PATENT DOCUMENTS

JP          2012167598 A      9/2012
JP          2013209043 A  * 10/2013

* cited by examiner

CONTROLLER FOR VEHICLE AND METHOD FOR CONTROLLING VEHICLE

RELATED APPLICATIONS

The present application claims priority of Japanese Application Number 2019-185867, filed on Oct. 9, 2019, the disclosure of which is hereby incorporated by reference herein in its entirety.

BACKGROUND

1. Field

This disclosure relates to a controller for a vehicle and a method for controlling a vehicle.

2. Description of Related Art

To cope with the emission of fuel vapor, a typical technique captures fuel vapor with a canister. Since there is a limit to the amount of fuel vapor that can be captured by the canister, purge control is executed to periodically refresh the canister.

Japanese Laid-Open Patent Publication No. 2012-167598 describes one example of a fuel vapor processing device for an engine. The processing device executes purge control that releases fuel vapor of a fuel tank, via a canister, into an intake passage of the engine. When a purge execution condition is satisfied, the fuel vapor processing device executes purge control in response to a purge request. The purge execution condition is the condition for permitting the execution of purge control. For example, the purge execution condition is satisfied when the engine is warmed up after being started and air-fuel ratio learning is complete.

An air-fuel ratio learning value is set for each of a plurality of air-fuel ratio learning ranges set in accordance with the engine load, and the air-fuel ratio learning value is learned for each air-fuel ratio learning range. Thus, an idle range has a corresponding air-fuel ratio learning value. The air-fuel ratio learning value corresponding to the idle range is learned when the engine is operating in the idle range.

Further, a vehicle that executes automatic stop and automatic starting control (hereinafter referred to as "the S&S control") automatically stops the engine when a predetermined stopping condition is satisfied and automatically starts the engine when a predetermined starting condition is satisfied. Execution of the S&S control stops the engine in the idle range and reduces fuel consumption.

A vehicle that executes S&S control automatically stops the engine when the stopping condition is satisfied. Thus, the engine is operated less frequently in the idle range. This may hinder updating of the air-fuel ratio value for the idle range. Thus, if learning of the air-fuel ratio learning value needs to be completed to satisfy the purge execution condition, purge control may not be executed even though purging has to be performed.

SUMMARY

It is an objective of the present disclosure to avoid a situation in which purge control cannot be executed when there is a need to perform purging in a vehicle that executes S&S control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a controller for a vehicle is provided. An engine including a fuel vapor processing device is mounted on the vehicle. The fuel vapor processing device is configured to execute purge control that releases fuel vapor of a fuel tank, via a canister, to an intake passage on condition that air-fuel ratio learning is complete. The controller includes processing circuitry configured to automatically stop the engine when an automatic stopping condition is satisfied, automatically start the engine when an automatic starting condition is satisfied, and determine whether a prohibition condition for prohibiting automatic stopping is satisfied. The processing circuitry is configured to determine that the prohibition condition is satisfied when the air-fuel ratio learning is incomplete, and the processing circuitry is configured to inhibit automatic stopping of the engine even if the automatic stopping condition is satisfied when determining that the prohibition condition is satisfied.

In another general aspect, a method for controlling a vehicle is provided. An engine including a fuel vapor processing device is mounted on the vehicle. The method includes executing purge control that releases fuel vapor of a fuel tank, via a canister, to an intake passage on condition that air-fuel ratio learning is complete, automatically stopping the engine when an automatic stopping condition is satisfied, automatically starting the engine when an automatic starting condition is satisfied, determining that a prohibition condition for prohibiting automatic stopping is satisfied when the air-fuel ratio learning is incomplete, and inhibiting automatic stopping of the engine even if the automatic stopping condition is satisfied when determined that the prohibition condition is satisfied.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described.

Modifications and equivalents of the methods, apparatuses, and/or systems described are apparent to one of ordinary skill in the art. Sequences of operations are exemplary, and may be changed as apparent to one of ordinary skill in the art, with the exception of operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

Figure 1:
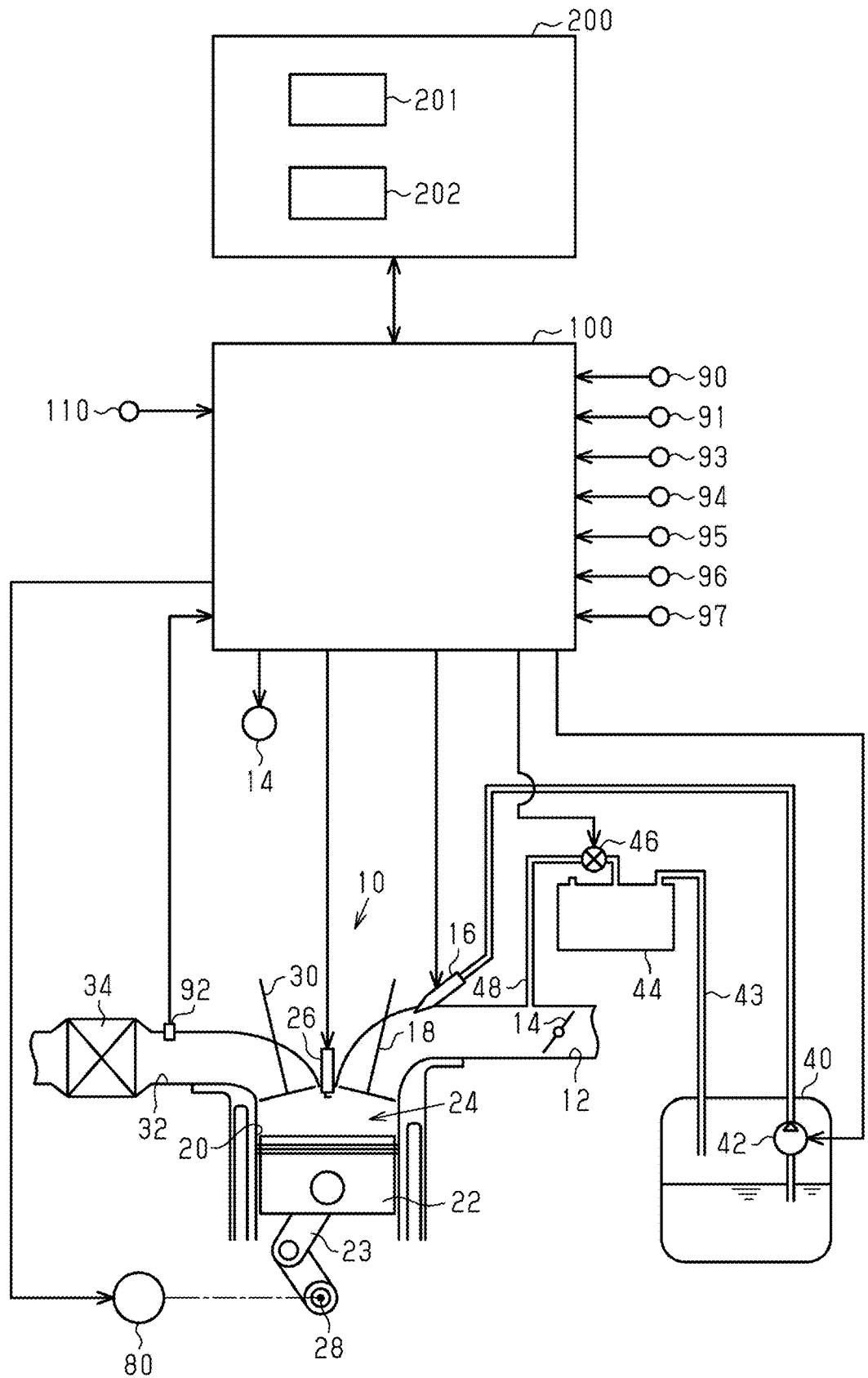
FIG. 1 is a schematic diagram showing the relationship of a controller for a vehicle and an engine controller and the structure of an engine, which is controlled by the engine controller.

One embodiment of the present disclosure will now be described with reference to FIGS. 1 to 7. FIG. 1 shows a controller 200 for a vehicle, an engine 10, and an engine controller 100 that controls the engine 10.

The engine 10 shown in FIG. 1 is a multi-cylinder engine including a plurality of cylinders 20 (only one shown). A piston 22 is arranged in each cylinder 20. The piston 22 is connected by a connecting rod 23 to a crankshaft 28, which is an engine output shaft. The connecting rod 23 converts the reciprocating motion of the piston 22 to a rotating motion of the crankshaft 28. A crank position sensor 91 detects the rotation speed of the crankshaft 28.

A starter motor 80 is coupled to the crankshaft 28. The starter motor 80 cranks and starts the engine 10.

The piston 22 forms a combustion chamber 24 in the cylinder 20. A spark plug 26 is arranged in the combustion chamber 24 to ignite an air-fuel mixture.

The combustion chamber 24 is connected via an intake valve 18 to an intake passage 12 and via an exhaust valve 30 to an exhaust passage 32. The engine 10 includes a port injection valve 16 that injects fuel into an intake port, which is the portion of the intake passage 12 connected to the combustion chamber 24. Fuel from a fuel tank 40 is pressurized to a predetermined fuel pressure by a fuel pump 42 and supplied to the port injection valve 16. The port injection valve 16 is driven to supply fuel to the intake port so that the fuel and air is supplied to the combustion chamber 24.

A throttle valve 14 is arranged in the intake passage 12 at the upstream side of the port injection valve 16 to adjust the intake air amount, which is the amount of air drawn into the combustion chamber 24. An air flow meter 90 is arranged in the intake passage 12 at the upstream side of the throttle valve 14 to detect the intake air amount.

An exhaust purification device 34, which purifies the exhaust when the air-fuel ratio of the air-fuel mixture is in a predetermined range, is arranged in the exhaust passage 32. An air-fuel ratio sensor 92 is arranged in the exhaust passage 32 at the upstream side of the exhaust purification device 34 to detect the oxygen concentration of the exhaust flowing through the exhaust passage 32. The air-fuel ratio of the air-fuel mixture burned in the combustion chamber 24 can be estimated from the oxygen concentration of the exhaust detected by the air-fuel ratio sensor 92.

The engine 10 includes a fuel vapor processing device that uses a canister 44 to process fuel vapor that is produced in the fuel tank 40. The canister 44 includes a U-shaped flow passage extending through a synthetic resin case and a porous absorbent arranged in the case. The canister 44 is connected by a fuel vapor passage 43 to an open space in the upper part of the fuel tank 40. Further, the canister 44 is connected by a purge passage 48 to an intake system of the engine 10, for example, the downstream side of the throttle valve 14 in the intake passage 12. A purge valve 46 is arranged in the purge passage 48 to control the amount of purge gas flowing into the intake passage 12. The purge valve 46 is configured to stop the flow of purge gas when a predetermined condition, such as the engine still being cold or fuel being cut off, is satisfied.

With reference to FIG. 1, the functional configuration of the controller 200 and the engine controller 100 will now be described. As shown in FIG. 1, the controller 200 and the engine controller 100 are connected to each other in a manner allowing for communication. When a predetermined stopping condition is satisfied, the controller 200 instructs the engine controller 100 to automatically stop the engine 10. When a predetermined starting condition is satisfied, the controller 200 instructs the engine controller 100 to automatically start the engine 10. The engine controller 100 automatically stops or automatically starts the engine 10 as instructed. In this manner, the controller 200 executes S&S control that automatically stops the engine when the predetermined stopping condition is satisfied and automatically starts the engine when the predetermined starting condition is satisfied.

The controller 200 includes an instruction unit 201 and a prohibition determination unit 202. The instruction unit 201 instructs the engine controller 100 to automatically stop the engine when an automatic stopping condition is satisfied and automatically start the engine when an automatic starting condition is satisfied. The prohibition determination unit 202 determines whether a prohibition condition for prohibiting automatic stopping of the engine is satisfied.

The engine controller 100 is electrically connected to the air flow meter 90, the crank position sensor 91, the air-fuel ratio sensor 92, a vehicle speed sensor 93, an accelerator position sensor 94, a shift position sensor 95, a coolant temperature sensor 96, a tail lamp switch 97, and the like. For example, the accelerator position sensor 94 detects the accelerator depression amount, which is the amount of the accelerator pedal depressed by the driver. Based on the information detected by these various detection systems, the engine controller 100 executes various types of controls such as fuel injection control.

For example, the engine controller 100 executes feedback control on the fuel injection amount based on the exhaust oxygen concentration detected by the air-fuel ratio sensor 92. The engine controller 100 also executes air-fuel ratio learning control for learning an air-fuel ratio learning value used for the feedback control. In the air-fuel ratio learning control, the engine controller 100 updates the air-fuel ratio learning value so that a feedback correction amount of the fuel injection amount used for feedback control is converged to a value proximate to zero (0). More specifically, when the feedback correction amount is a positive value, the air-fuel ratio learning value is increased by a predetermined value in every predetermined control cycle. When the feedback correction amount is a negative value, the air-fuel ratio learning value is decreased by a predetermined value in every predetermined control cycle. When a state in which the feedback correction amount is converged to a value proximate to 0 continues for a predetermined time or longer, it is determined that learning of the air-fuel ratio learning value is complete. After the learning is completed, if the feedback correction amount is increased or decreased, it is determined that the air-fuel ratio learning value includes an error. Thus, the air-fuel ratio learning value is relearned. In this manner, in the present embodiment, learning is restarted on condition that the feedback correction amount after completing learning becomes greater than or equal to a predetermined learning restarting determination value. Thus, a period during which air-fuel ratio learning is completed refers to a period from when air-fuel ratio learning is completed to when the learning restarting condition is satisfied and learning is restarted. A period during which air-fuel ratio learning is incomplete refers to a period until learning of the air-fuel ratio learning value is completed and a period from when the learning restarting condition is satisfied and learning is restarted to when learning is completed again.

The engine controller 100 executes air-fuel ratio learning control when the engine 10 is operating in a state satisfying a condition for executing air-fuel ratio learning. An air-fuel ratio learning value is set for each of a plurality of air-fuel ratio learning ranges set in accordance with the engine load, and the air-fuel ratio learning value is learned for each air-fuel ratio learning range. The air-fuel ratio learning value for each air-fuel ratio learning range is stored in a non-volatile memory and held in the non-volatile memory even when the engine controller 100 is deactivated. Thus, for example, when learning of the air-fuel ratio learning value is performed for the idle range, the learning is performed by obtaining a predetermined value in every control cycle on condition that the engine is stably operating in the idle range. Even if the operation range of the engine 10 is changed before learning is completed, learning will be restarted when operation in the idle range is stabilized again.

Further, to cope with the emission of fuel vapor, the engine controller 100 executes purge control to release fuel vapor of the fuel tank 40, via the canister 44, into the intake passage 12 of the engine 10. In the engine 10, the fuel vapor produced in the fuel tank 40 when the vehicle is not traveling flows through the fuel vapor passage 43 into the canister 44 and is absorbed by the absorbent in the canister 44. The engine controller 100 opens the purge valve 46 when a predetermined purge permission condition is satisfied while the engine 10 is running. When the purge valve 46 opens, the negative pressure at the downstream side of the throttle valve 14 in the intake passage 12 causes fresh air to flow from an atmospheric port through the canister 44. This removes fuel components from the absorbent, and the fresh air including the fuel components is drawn as purge gas into the intake passage 12 of the engine 10. Accordingly, as long as the engine 10 is operated often enough, the absorption and removal of fuel vapor will be spontaneously repeated in the canister 44.

The purge permission condition is not satisfied when air-fuel ratio learning is incomplete. If the execution of purge control is permitted when air-fuel ratio learning is incomplete and an error is included in the air-fuel ratio, there will be no way to determine whether the error was caused by the fuel injection amount or the purge gas amount. For this reason, purge control is executed after completing the air-fuel ratio learning for the fuel injection amount.

Figure 2:
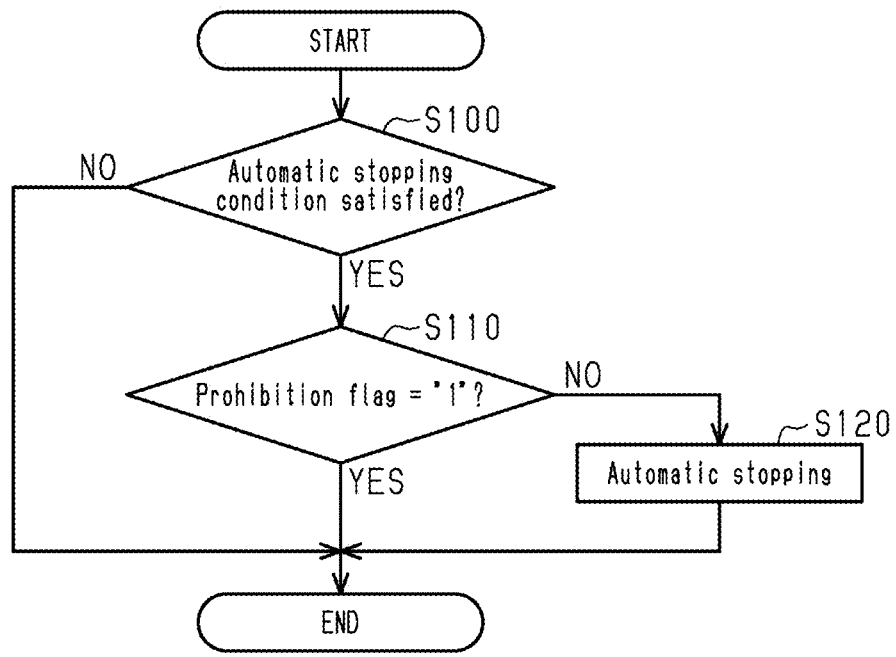
FIG. 2 is a flowchart illustrating the process of an automatic stopping control executed by the controller of FIG. 1.

The S&S control of the present embodiment will now be described with reference to FIGS. 2 to 5. Automatic stopping control in the S&S control will first be described. FIG. 2 is a flowchart illustrating the process of the automatic stopping control in the S&S control. The controller 200 repetitively executes the automatic stopping control, which is illustrated in FIG. 2, when the engine is running.

When starting the automatic stopping control, the controller 200 first performs step S100. In step S100, the instruction unit 201 of the controller 200 determines whether the automatic stopping condition is satisfied. The automatic stopping condition is the condition for permitting automatic stopping of the engine 10 and satisfied when all four requirements shown below are satisfied.

Warming up of the engine 10 is complete.
The brake pedal is being depressed.
The accelerator pedal is not depressed.
The vehicle speed is less than or equal to an automatic stopping initiation speed.

The determination of whether warming up is complete is based on whether a coolant temperature of the engine 10 detected by the coolant temperature sensor 96 is greater than or equal to a warm-up completion temperature. Depression of the brake pedal is detected by the tail lamp switch 97. Non-depression of the accelerator pedal is detected from the output signal of the accelerator position sensor 94.

When the automatic stopping condition is satisfied (step S100: YES), the controller 200 proceeds to step S110.

In step S110, the controller 200 determines whether the prohibition condition is satisfied with the prohibition determination unit 202. More specifically, the controller 200 determines whether a prohibition flag is "1." The prohibition flag is "1" when the prohibition determination unit 202 determines that the prohibition condition is satisfied and "0" when the prohibition determination unit 202 determines that the prohibition condition is unsatisfied.

When the prohibition flag is not "1" (step S110: NO), that is, when the prohibition flag is "0," the controller 200 proceeds to step S120. In step S120, the instruction unit 201 of the controller 200 instructs the engine controller 100 to automatically stop the engine 10. In response to the instruction, the engine controller 100 stops the engine 10. When the engine 10 automatically stops, the routine is temporarily ended.

When the prohibition flag is "1" (step S110: YES), the controller 200 does not perform step S120. In this case, the routine is temporarily ended. In this manner, when the prohibition condition is satisfied, the controller 200 does not automatically stop the engine 10 even if the automatic stopping condition is satisfied.

When the automatic stopping condition is unsatisfied, (step S100: NO), the controller 200 does not perform steps S110 and S120. In this case, the routine is temporarily ended.

Figure 3:
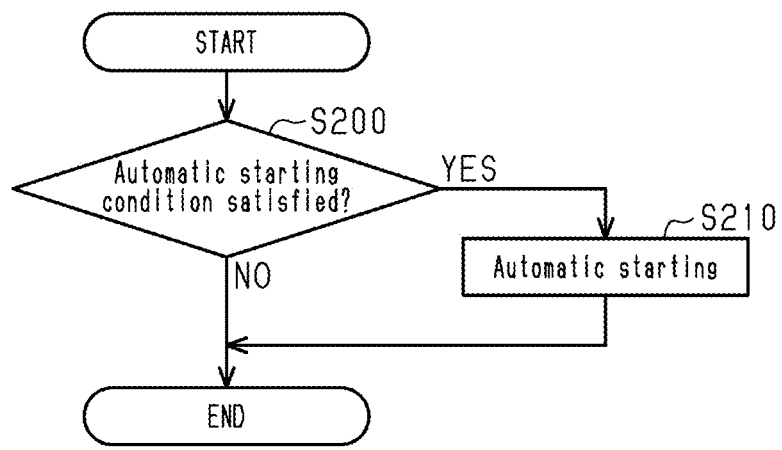
FIG. 3 is a flowchart illustrating the process of an automatic starting control executed by the controller of FIG. 1.

Automatic starting control in the S&S control will now be described. FIG. 3 is a flowchart illustrating the process of the automatic starting control in the S&S control. The controller 200 repetitively executes the automatic starting control, which is illustrated in FIG. 3, when the engine is not running.

When starting the automatic starting control, the controller 200 first performs step S200. In step S200, the instruction unit 201 of the controller 200 determines whether the automatic starting condition is satisfied. The automatic starting condition is the condition for permitting automatic starting of the engine 10 and is satisfied if the automatic stopping condition is unsatisfied. For example, if the depressed brake pedal is released or the accelerator pedal is depressed when the automatic stopping condition is satisfied, the automatic starting condition will be satisfied.

When the automatic starting condition is satisfied (step S200: YES), the controller 200 proceeds to step S210. In step S210, the instruction unit 201 of the controller 200 instructs the engine controller 100 to automatically start the engine 10. In response to the instruction, the engine controller 100 restarts the engine 10. When the engine 10 automatically starts, the routine is temporarily ended.

When the automatic starting condition is unsatisfied, (step S200: NO), the controller 200 does not perform step S210. In this case, the routine is temporarily ended. In this manner, the controller 200 automatically starts the engine 10 when the automatic starting condition is satisfied.

Figure 4:
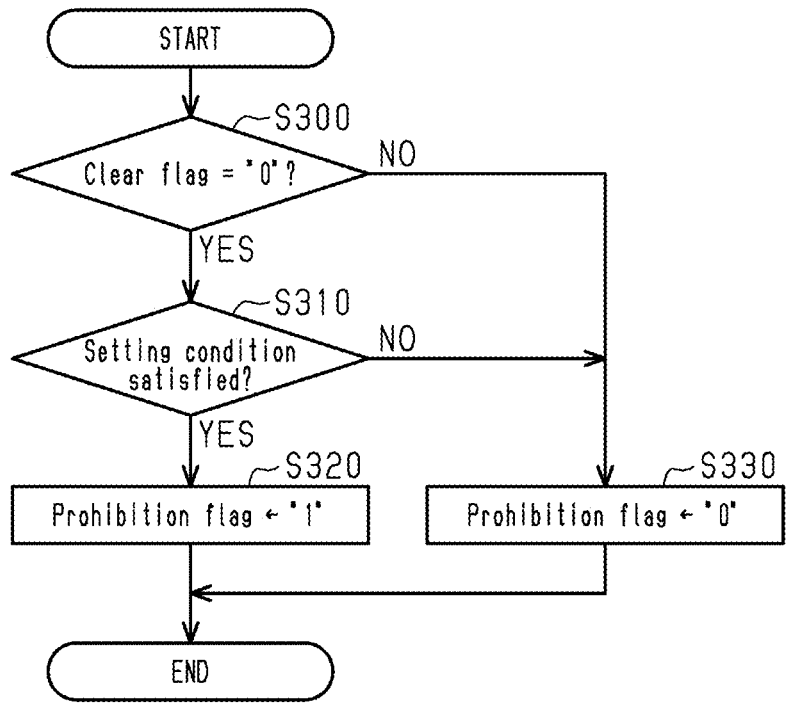
FIG. 4 is a flowchart illustrating the process of a setting condition determination control executed by the controller of FIG. 1.

A prohibition flag setting condition determination control in the S&S control will now be described. FIG. 4 is a flowchart illustrating the process of the prohibition flag setting condition determination control in the S&S control. The controller 200 repetitively executes the setting condition determination control, which is illustrated in FIG. 4, when a main switch 110 of the vehicle, which includes the engine 10, is turned on. As shown in FIG. 1, the main switch 110 is connected to the engine controller 100. The controller 200 detects that the main switch 110 is on through communication with the engine controller 100.

When starting the setting condition determination control, the controller 200 first performs step S300. In step S300, the prohibition determination unit 202 of the controller 200 determines whether the clear flag is "0." The clear flag is set through a clearing condition determination control, which will be described later. The clear flag is set to "1" when a clearing condition is satisfied and set to "0" when the clearing condition is unsatisfied.

When the clear flag is set to "0" (step S300: YES), the controller 200 proceeds to step S310. When the clear flag is not set to "0" (step S300: NO), that is, when the clear flag is set to "1," the controller 200 proceeds to step S330.

In step S310, the prohibition determination unit 202 of the controller 200 determines whether the setting condition is satisfied. The setting condition is the condition for setting the prohibition flag and satisfied when all five requirements shown below are satisfied.

The condition for executing air-fuel ratio learning is satisfied.

Warming up of the engine 10 is complete.

Air-fuel ratio learning for the idle range is incomplete.

The vehicle speed is less than or equal to a predetermined speed that is greater than the automatic stopping initiation speed.

Rotation decreasing control is not being executed on the engine 10.

Rotation decreasing control is executed so that a sudden change in the load acting on the crankshaft 28 does not suddenly decrease the rotation speed of the crankshaft 28 and thereby stop operation. More specifically, when detecting an indication of a sudden decrease in the rotation speed of the crankshaft 28, the engine controller 100 adjusts the open degree and fuel injection amount of the throttle valve 14 and the ignition timing.

When the setting condition is satisfied (step S310: YES), the controller 200 proceeds to step S320. In step S320, the prohibition determination unit 202 of the controller 200 sets the prohibition flag to "1." When the setting condition is unsatisfied (step S310: NO), the controller 200 proceeds to step S330. In step S330, the prohibition determination unit 202 of the controller 200 sets the prohibition flag to "0."

After the prohibition flag is updated in step S320 or step S330, the routine is temporarily ended. The prohibition flag is cleared when the main switch 110 is turned OFF.

In this manner, when the clearing condition is unsatisfied and the setting condition is satisfied, that is, when steps S300 and S310 both result in affirmative determinations, the prohibition determination unit 202 of the controller 200 determines that the prohibition condition is satisfied and sets the prohibition flag to "1." When the clearing condition is satisfied (step S300: NO), the prohibition determination unit 202 determines that the prohibition condition is unsatisfied even if the setting condition is satisfied and sets the prohibition flag to "0."

Figure 5:
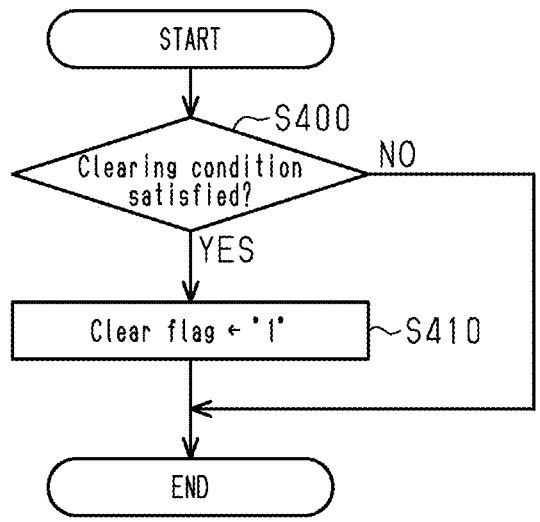
FIG. 5 is a flowchart illustrating the process of a clearing condition determination control executed by the controller of FIG. 1.

Finally, the clearing condition determination control in the S&S control will be described. FIG. 5 is a flowchart illustrating the process of a clearing condition determination control in the S&S control. The controller 200 repetitively executes the clearing condition determination control, which is illustrated in FIG. 5, when the prohibition flag is "1."

When starting the clearing condition determination control, the controller 200 first performs step S400. In step S400, the prohibition determination unit 202 of the controller 200 determines whether the clearing condition is satisfied. The clearing condition is the condition for setting the prohibition flag to "0" regardless of whether the setting condition is satisfied. The controller 200 determines that the clearing condition is satisfied when an accumulated value of a stable idle operation time of the engine 10 is greater than or equal to a threshold value. The stable idle operation time is the time from a time point at which duration of an idle operation of the engine 10 reaches a predetermined time to a time point at which the idle operation ends. The controller 200 calculates the accumulated stable idle operation time during the period from when the main switch 110 is turned ON to when the main switch 110 is turned OFF.

Figure 6:
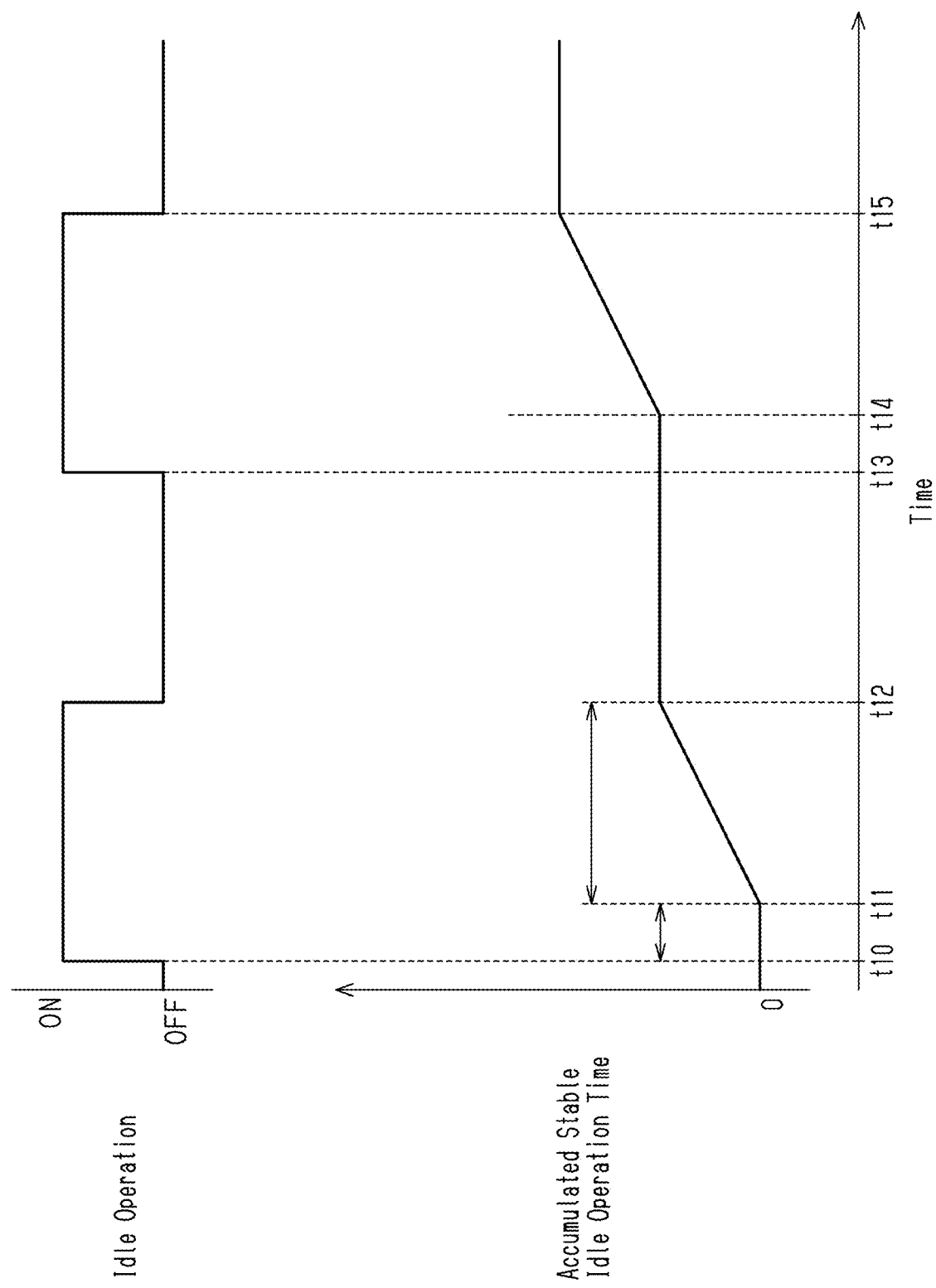
FIG. 6 is a time chart showing the relationship of idle operation and accumulated stable idle operation time in the controller of FIG. 1.

The accumulated stable idle operation time will now be described with reference to FIG. 6. FIG. 6 is a time chart showing the relationship of idle operation and accumulated stable idle operation time. In FIG. 6, an idle operation is performed (ON) when the operation range of the engine 10 is in the idle range and not performed (OFF) when the operation range of the engine 10 is not in the idle range.

In the example of FIG. 6, an idle operation is performed in the period from time t10 to time t12 and the period from time t13 to time t15. In the periods in which an idle operation is performed, the period from time t10 to time t11 and the period from time t13 to time t14 are periods from when idle operation is initiated to when the duration of the idle operation reaches a predetermined time. During these periods, the controller 200 does not increase the accumulated stable idle operation time even though an idle operation is being performed. The predetermined time is set in correspondence with the time required for the air-fuel ratio to stabilize after an idle operation is initiated.

In the periods in which an idle operation is performed, the period from time t11 to time t12 and the period from time t14 to time t15 are periods in which the air-fuel ratio is stable after the idle operation has continued for the predetermined time. The controller 200 determines that an idle operation is stable when the air-fuel ratio is stable and accumulates the stable idle operation time. Thus, the accumulated stable idle operation time is increased during the period from time t11 to time t12 and the period from time t14 to time t15. As described above, the controller 200 determines that the clearing condition is satisfied when the accumulated stable idle operation time is greater than or equal to a threshold value.

As shown in FIG. 5, when the clearing condition is satisfied (step S400: YES), the controller 200 proceeds to step S410. In step S410, the prohibition determination unit 202 of the controller 200 sets the clear flag to "1." Then, the routine is temporarily ended.

When the clearing condition is unsatisfied (step S400: NO), the controller 200 temporarily ends the routing without performing step S410.

In this manner, the prohibition determination unit 202 of the controller 200 sets the clear flag to "1" when the clearing condition is satisfied. The clear flag is set to "0" when the clearing condition is unsatisfied. The accumulated stable idle operation time and the clear flag are cleared when the main switch 110 is turned OFF. That is, when the main switch 110 is turned OFF, the accumulated time is reset to "0" and the clear flag is set to "0."

Figure 7:
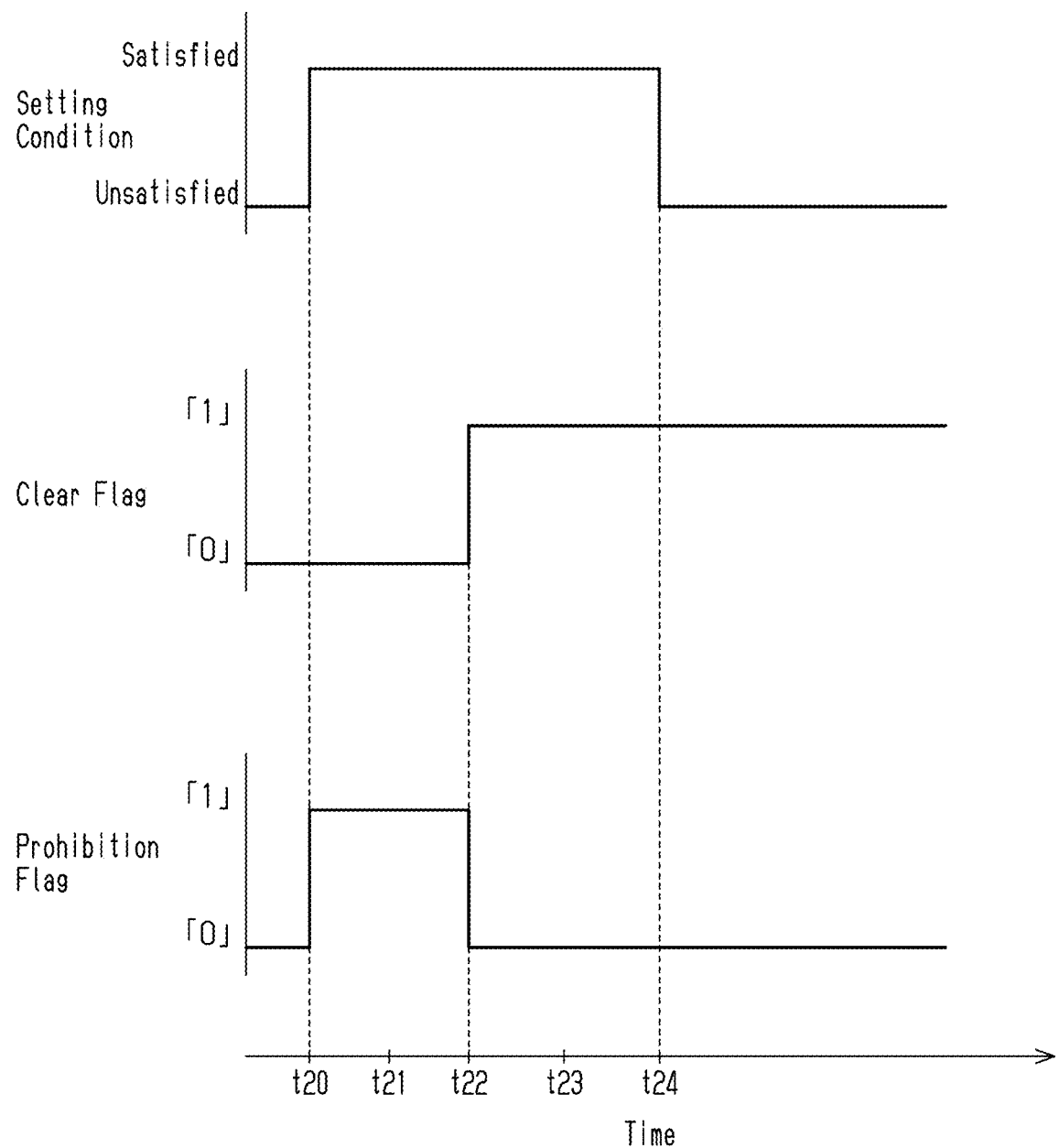
FIG. 7 is a time chart showing the relationship of a setting condition, a clear flag, and a prohibition flag in the controller of FIG. 1.

The operation of the S&S control in the present embodiment will now be described with reference to FIG. 7. FIG. 7 is a time chart showing the relationship of the setting condition, the clear flag, and the prohibition flag. FIG. 7 illustrates whether the setting condition is satisfied, the transition of the clear flag, and the transition of the prohibition flag.

In the example illustrated in FIG. 7, the setting condition is satisfied during the period from time t20 to time t24. The clear flag is "0" until time t22, and the clear flag is "1" from time t22.

As described with reference to FIG. 4, in the controller 200, when the clear flag is "0" (step S300: YES) and the setting condition is satisfied (step S310: YES), the prohibition determination unit 202 sets the prohibition flag to "1" (step S320). When the clear flag is "1" (step S300: NO), the prohibition determination unit 202 sets the prohibition flag to "0" regardless of the setting condition (step S330). That is, when the clearing condition is satisfied, the prohibition determination unit 202 determines that the prohibition condition is unsatisfied even if the setting condition is satisfied. Thus, in the example illustrated in FIG. 7, the prohibition flag is set to "1" during the period from time t20 to time t22, and the prohibition flag is set to "0" from time t22.

Accordingly, in the S&S control, when the automatic stopping condition is satisfied (step S100: YES) at time t21, the prohibition flag is set to "1" (step S110: YES). Thus, the controller 200 does not perform automatic stopping. In this case, the prohibition determination unit 202 determines that the prohibition condition is satisfied. Thus, the instruction unit 201 does not automatically stop the engine 10 even if the automatic stopping condition is satisfied.

Further, in the S&S control, when the automatic stopping condition is satisfied (step S100: YES) at time t23, the prohibition flag is set to "0" (step S110: NO). Thus, the controller 200 performs automatic stopping (step S120). As described above, in this case, the clear flag is set to "1" (step S300: NO). Thus, even if the setting condition is satisfied, the prohibition determination unit 202 determines that the prohibition flag is unsatisfied and sets the prohibition flag to "0" (step S330). That is, the controller 200 cancels the prohibition of automatic stopping. As long as the clear flag continues to be "1," the prohibition flag remains set to "0." As described above, the prohibition flag and the clear flag are reset to "0" when the main switch 110 is turned OFF.

As described above, the controller 200 sets the prohibition flag to "1" when the setting condition is satisfied (step S310: YES). The setting condition is a logical conjunction of a proposition which includes that the air-fuel ratio learning is incomplete for the idle range. Thus, in the S&S control executed by the controller 200, when the air-fuel ratio learning for the idle range is incomplete, the S&S control prohibits automatic stopping of the engine 10. Consequently, air-fuel ratio learning is performed more frequently in the idle range, thereby allowing air-fuel ratio learning to be more easily completed.

The advantages of the present embodiment will now be described.

(1) Air-fuel ratio learning is expedited in the idle range, and the purge execution condition is satisfied more easily. Since purge control is more easily executed and the canister is more easily refreshed, the emission of fuel vapor is reduced.

(2) The controller 200 prohibits automatic stopping of the engine 10 when the setting condition is satisfied. The setting condition is a logical conjunction of a proposition which includes that the air-fuel ratio learning condition is satisfied in addition to the air-fuel ration learning being incomplete. Thus, when air-fuel ratio learning cannot be performed even though the air-fuel ratio learning is incomplete, it is not determined that the prohibition condition is satisfied, and the engine 10 is automatically stopped when the automatic stopping condition is satisfied. Accordingly, the controller 200 avoids a situation that prohibits automatic stopping of the engine 10 and continues unnecessary idle operation to expedite air-fuel ratio learning even though air-fuel ratio learning cannot be performed. This limits decreases in the fuel efficiency that would occur if the engine 10 were not to be automatically stopped.

(3) The air-fuel ratio is unstable immediately after an idle operation is initiated. Thus, when extremely short idle operations are repetitively performed, learning of the air-fuel ratio learning value may not be completed even if the accumulated idle operation time becomes relatively large. In this regard, when the accumulated value of the stable idle operation time is greater than or equal to the threshold value, the controller 200 determines that the prohibition condition is unsatisfied even if the setting condition is satisfied and cancels the prohibition of automatic stopping. This avoids a situation in which continued prohibition of automatic stopping hinders the fuel consumption-reduction effect of S&S control. Thus, the emission of fuel vapor can be decreased while reducing fuel consumption. Further, the use of the accumulated value of the stable idle operation time allows for appropriate determination that air-fuel ratio learning for the idle range is being executed often enough and that the prohibition of automatic stopping can be canceled.

The above embodiment may be modified as described below. The above embodiment and the modified examples described below may be combined as long as there is no technical contradiction.

The above embodiment illustrates an example of a controller for a vehicle including the engine 10, which serves as a drive source. Instead, the controller may be configured to be used with a hybrid vehicle including the engine 10 and a motor that serve as a drive source or a series-hybrid including a motor that serves a drive source and the engine 10 that serves as a generator. That is, a configuration similar to that of the above embodiment may be applied to the controller of a hybrid vehicle. More specifically, in a hybrid vehicle including an engine controller that controls the engine 10 and a motor controller that controls a motor, a hybrid vehicle controller, which sends a control instruction to the engine controller and the motor controller, may include the instruction unit 201 and the prohibition determination unit 202 of the controller 200 in accordance with the above embodiment. In this case, the hybrid vehicle controller is equivalent to a vehicle controller that implements the functionality of the controller 200 in accordance with the above embodiment.

In the above embodiment, the vehicle controller is exemplified by the controller 200 that sends an automatic stopping instruction or an automatic starting instruction to the engine controller 100 to automatically stop or automatically start the engine 10. However, the vehicle controller is not limited to such a configuration. For example, the vehicle controller may be configured to combine the configurations of the controller 200 and the engine controller 100 in accordance with the above embodiment in a single controller.

In the present disclosure, "the controller" may be configured as processing circuitry including 1) one or more processors that run on computer programs (software), 2) one or more dedicated hardware circuits such as application-specific integrated circuits (ASICs) that execute at least some of various types of processes, or 3) a combination of processors and hardware circuits. The processors include a CPU and a memory such as a RAM and a ROM, and the memory stores program codes or instructions configured to have the CPU execute processes. The memory, namely, a computer readable medium, includes any usable medium that is accessible by a versatile or dedicated computer.

The content of the clearing condition is not limited to the example illustrated in the above embodiment and may be changed. For example, the clear flag can be set to "1" on condition that a state in which the prohibition flag is set to "1" has continued over a predetermined time. In such a case, even if the setting condition is satisfied, when a state in which the prohibition condition is satisfied continues over a predetermined time, it will be determined that the prohibition condition is not satisfied and the prohibition of automatic stopping will be canceled. This avoids a situation in which continued prohibition of automatic stopping hinders the fuel consumption-reduction effect of S&S control. Thus, the emission of fuel vapor can be decreased while reducing fuel consumption. Further, the clear flag may be set to "1" on condition that the accumulated idle time is greater than or equal to a threshold value. The air-fuel ratio learning value corresponding to the idle range is updated when an idle operation is being continuously performed. In such a case, when the accumulated idle time is greater than or equal to a threshold value, it will be determined that the prohibition condition is unsatisfied even if the setting condition is satisfied. Thus, the prohibition of automatic stopping will be canceled. In comparison with when canceling the prohibition of automatic stopping only under the condition that the duration of a state in which the prohibition condition is satisfied is greater than or equal to a predetermined time, it can be appropriately determined that air-fuel ratio learning for the idle range is being executed often enough and that the prohibition of automatic stopping can be canceled.

In the above embodiment, the stable idle operation time is the time from a time point at which the duration of an idle operation reaches a predetermined time to a time point at which the idle operation ends. However, there is no limitation to the stable idle operation time. The time during which the engine rotation speed is in a predetermined idle rotation speed range may be the stable idle operation time.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A controller for a vehicle, wherein an engine including a fuel vapor processing device is mounted on the vehicle, and the fuel vapor processing device is configured to execute purge control that releases fuel vapor of a fuel tank, via a canister, to an intake passage on condition that air-fuel ratio learning is complete, the controller comprising:
   processing circuitry configured to automatically stop the engine when an automatic stopping condition is satisfied, automatically start the engine when an automatic starting condition is satisfied, and determine whether a prohibition condition for prohibiting automatic stopping is satisfied, wherein
   the processing circuitry is configured to determine that the prohibition condition is satisfied when the air-fuel ratio learning is incomplete and a speed of the vehicle is less than or equal to a speed threshold, and the speed threshold is greater than 0, and
   the processing circuitry is configured to inhibit automatic stopping of the engine, even if the automatic stopping condition is satisfied, when determining that the prohibition condition is satisfied.

2. The controller according to claim 1, wherein the processing circuitry is configured to determine that the prohibition condition is satisfied when a setting condition is satisfied, with the setting condition being a logical conjunction of a proposition which includes that the air-fuel ratio learning is enabled in addition to the air-fuel ratio learning being incomplete.

3. The controller according to claim 2, wherein the processing circuitry is configured to determine that the prohibition condition is unsatisfied, even if the setting condition is satisfied, when a clearing condition is satisfied, with the clearing condition requiring the prohibition condition to be continuously satisfied over a predetermined time.

4. The controller according to claim 2, wherein the processing circuitry is configured to determine that the prohibition condition is unsatisfied, even if the setting condition is satisfied, when a clearing condition is satisfied, with the clearing condition requiring an accumulated value of time during which the engine performs an idle operation from when a main switch of the vehicle is turned on to when the main switch is turned off to be greater than or equal to a threshold value.

5. The control device according to claim 2, wherein
   when a stable idle operation time is a time from a time point at which duration of an idle operation of the engine reaches a predetermined time to a time point at which the idle operation ends,
   the processing circuitry is configured to determine that the prohibition condition is unsatisfied, even if the setting condition is satisfied, when a clearing condition is satisfied, with the clearing condition requiring an accumulated value of the stable idle operation from when a main switch of the vehicle is turned on to when the main switch is turned off to be greater than or equal to a threshold value.

6. A method for controlling a vehicle, wherein an engine including a fuel vapor processing device is mounted on the vehicle, the method comprising:
   initiating air-fuel learning;
   prohibiting purging of fuel vapor of a fuel tank to an intake passage after initiation of the air-fuel learning;
   permitting purging of the fuel vapor of the fuel tank to the intake passage in response to completion of the air-fuel ratio learning;
   automatically stopping the engine when an automatic stopping condition is satisfied;
   automatically starting the engine when an automatic starting condition is satisfied;

determining that a prohibition condition for prohibiting automatic stopping is satisfied when the air-fuel ratio learning is incomplete; and inhibiting automatic stopping of the engine even if the automatic stopping condition is satisfied when determined that the prohibition condition is satisfied.

7. A controller for a vehicle, the controller comprising:

processing circuitry configured to automatically stop the engine when an automatic stopping condition is satisfied, wherein the processing circuitry is configured to determine that a prohibition condition is satisfied in response to a determination that air-fuel ratio learning is incomplete, the processing circuitry is configured to inhibit automatic stopping of the engine, even if the automatic stopping condition is satisfied, in response to the prohibition condition being satisfied, the processing circuitry is configured to determine that the prohibition condition is satisfied when a setting condition is satisfied, with the setting condition being a logical conjunction of a proposition which includes that the air-fuel ratio learning is enabled in addition to the air-fuel ratio learning being incomplete, and the processing circuitry is configured to determine that the prohibition condition is unsatisfied, even if the setting condition is satisfied, when a clearing condition is satisfied, with the clearing condition requiring an accumulated value of time during which the engine performs an idle operation from when a main switch of the vehicle is turned on to when the main switch is turned off to be greater than or equal to a threshold value.

* * * * *